March 16, 1971   J. W. RICHMOND ET AL   3,570,238
DIRECT CURRENT ELECTRIC TIMEPIECE
Filed March 4, 1968   3 Sheets-Sheet 1
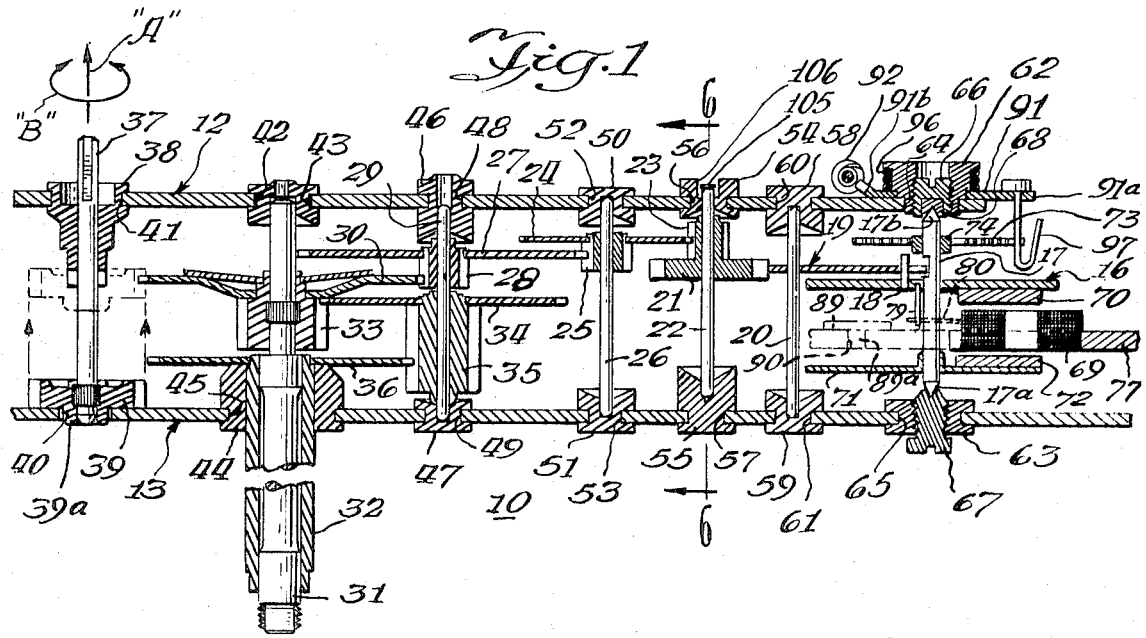
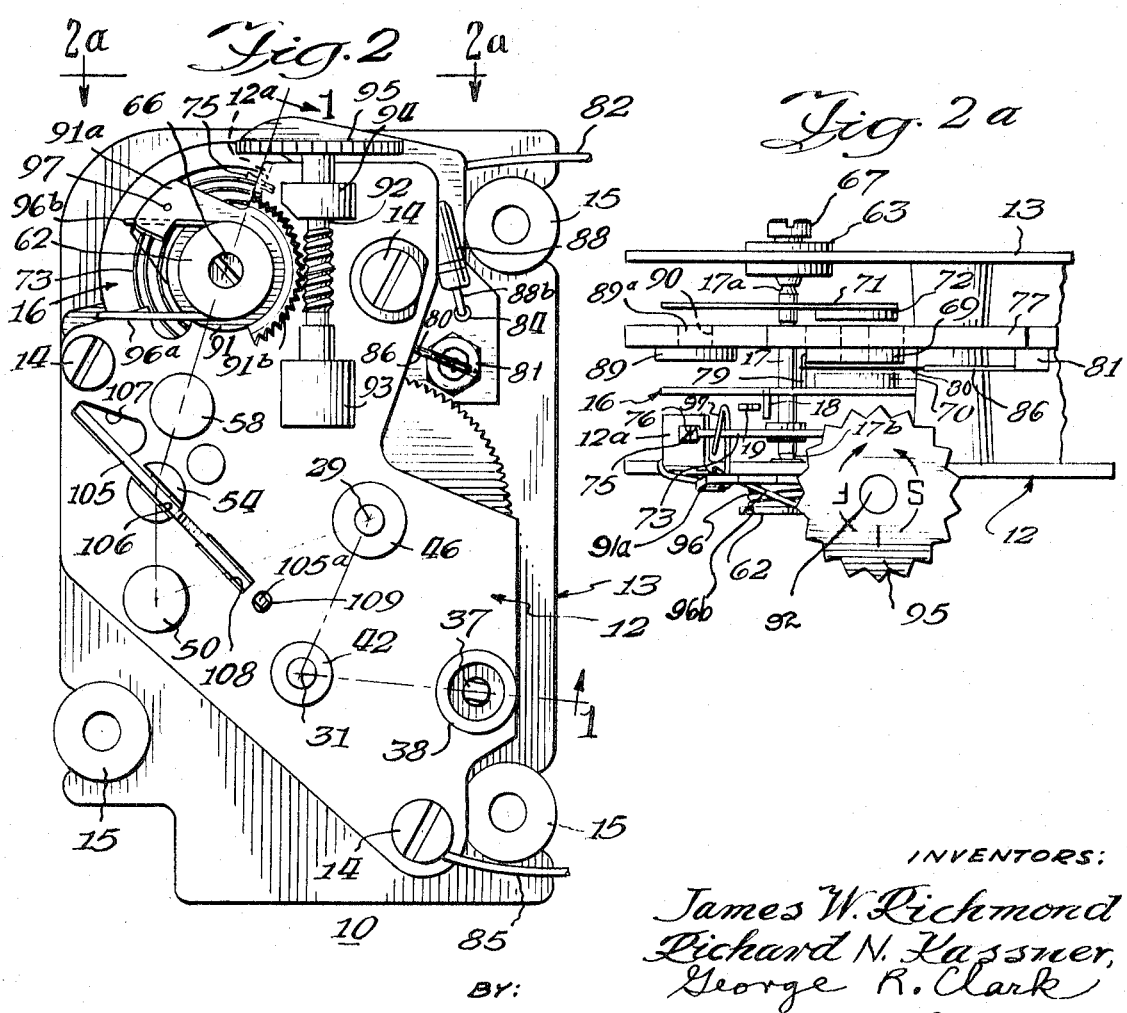
INVENTORS:
James W. Richmond
Richard N. Kassner,
George R. Clark
BY:
ATTORNEY

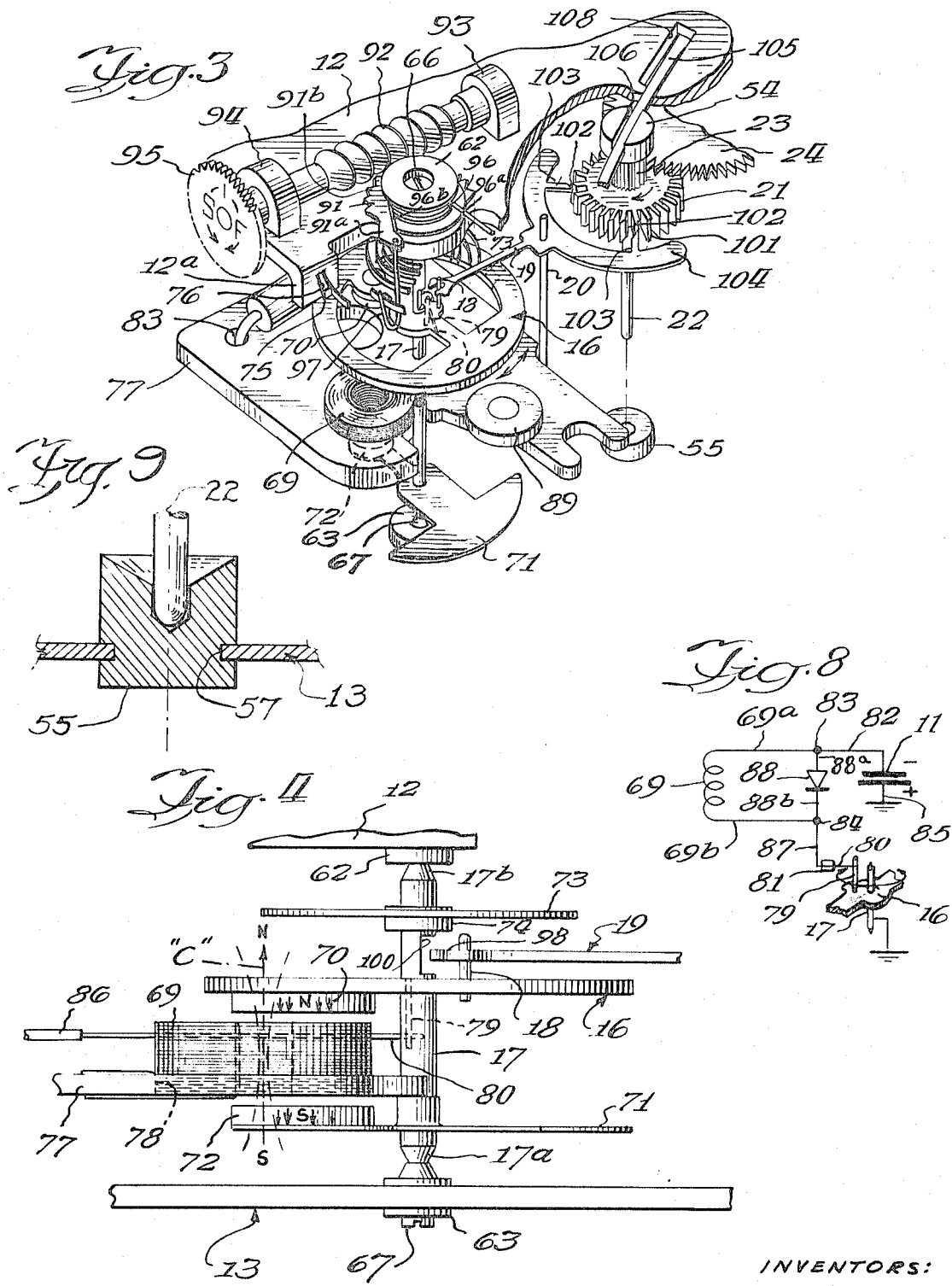

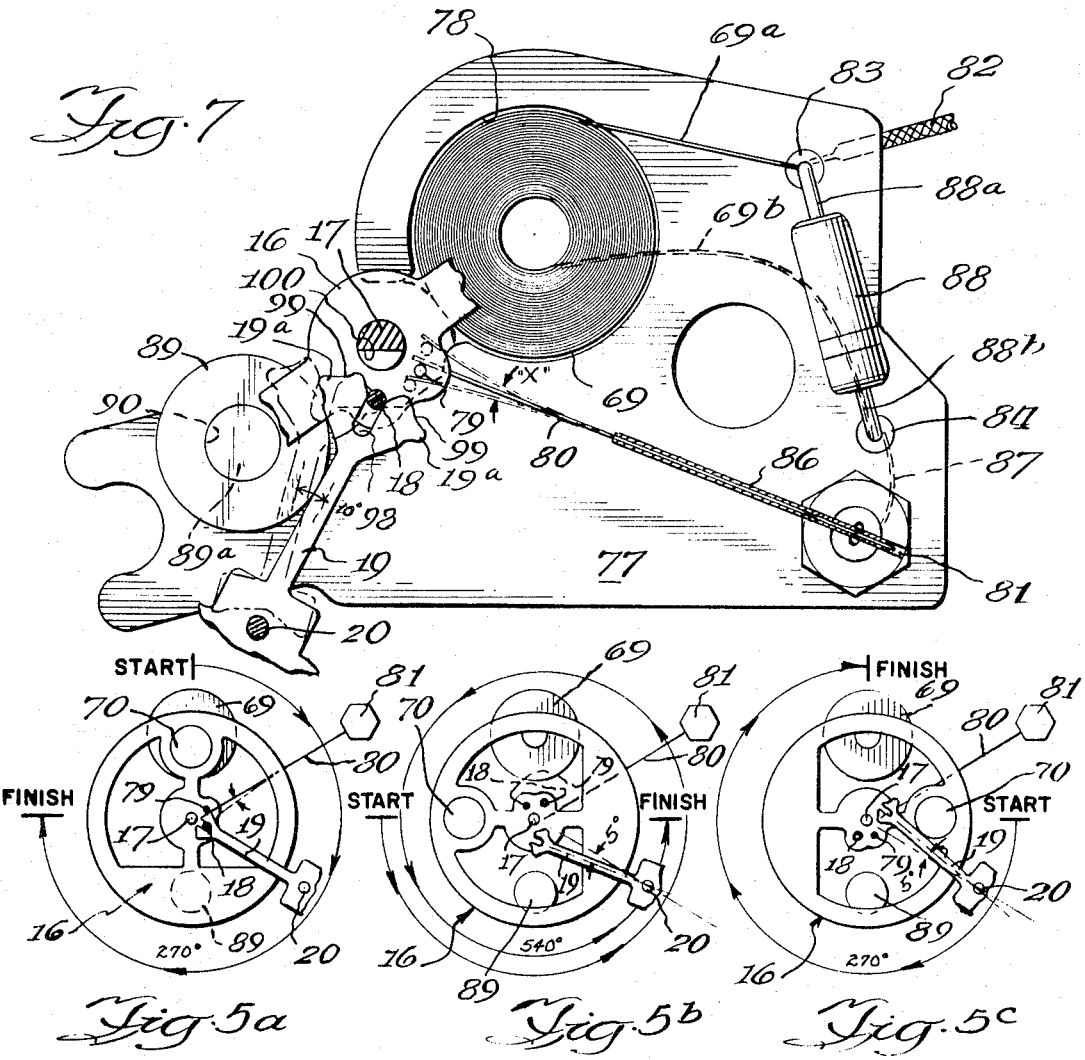
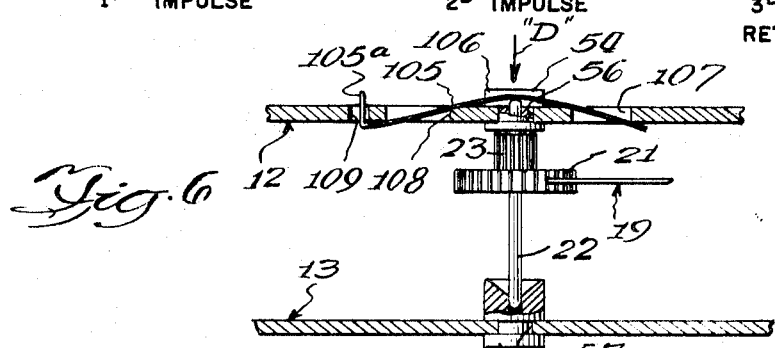
SHOWN IN START POSITION
ARROW INDICATES
1ST IMPULSE
SHOWN IN 2D POSITION
ARROW INDICATES
2D IMPULSE
SHOWN IN 3D POSITION
ARROW INDICATES
3D IMPULSE AND
RETURN TO START
POSITION United States Patent Office 3,570,238
Patented Mar. 16, 1971

3,570,238
DIRECT CURRENT ELECTRIC TIMEPIECE
James W. Richmond, Bensenville, and Richard N. Kassner, Lombard, Ill., assignors to Sunbeam Corporation, Chicago, Ill.
Filed Mar. 4, 1968, Ser. No. 710,273
Int. Cl. G04c 3/00
U.S. Cl. 58—28
16 Claims

ABSTRACT OF THE DISCLOSURE

A direct current electric timepiece comprising a balance wheel assembly including a shaft, a balance wheel mounted on the shaft, and permanent magnet means mounted on said balance wheel eccentric of said shaft and movable along an arcuate path in opposite directions from a neutral position lying on a plane extending radially of the shaft. Fixed electromagnetic coil means are centered on the neutral plane outwardly of the shaft and means are provided for selectively energizing and de-energizing the coil means to successively repel the permanent magnet means on the balance wheel, thereby providing magnetic impulse forces for oscillating the balance wheel in opposite directions from the neutral position. An eddy current damper is positioned diametrically opposite the coil means adjacent the path traversed by the magnet means on the balance wheel for opposing the movement of the balance wheel as it oscillates to prevent overbanking of the balance wheel when the battery power is in the high voltage range. The balance wheel assembly drivingly engages an escapement lever which rotates a toothed escapement wheel in synchronism with the oscillation of the balance wheel assembly. The escapement wheel is mounted on a shaft, and spring means is disposed at one end of the shaft for biasing the shaft axially against a bearing supporting the opposite end thereof to provide braking action on the shaft to prevent overtravel of the escapement wheel.

---

The present invention relates to direct current electric timepieces and, more particularly, to battery powered clocks or timepieces of the impulse-type employing a balance wheel assembly and a hairspring and an electromagnetic coil for oscillating the balance wheel at a constant rate for driving an escapement wheel.

One of the problems associated with the prior timepieces of the character described is the fact that the escapement wheel is subject to overtravel resulting in too much rotation on each oscillation of the balance wheel. The timepiece of the present invention includes means for holding the position of the escapement wheel so that it is advanced an exact amount on each oscillation or beat of the balance wheel assembly. In the timepiece of the present invention, the new and improved braking means associated with the escapement wheel insure that the escapement wheel rotates a precisely controlled degree during each beat or oscillation of the driving balance wheel assembly.

Another problem associated with prior timepieces of the character described is in providing means for adjusting and accurately maintaining the beat rate or rate of oscillation of the balance wheel assembly so that the timepiece will keep extremely accurate time. In the present invention, new and improved means is provided for regulating and maintaining the beat period of the balance wheel assembly to insure accurate timekeeping.

In direct current, battery powered timepieces of the character described, problems arise because of the decreasing batery voltage as the battery ages while in use. Accordingly, the timekeeping device of the present invention employs new and improved means for maintaining the rate of oscillation of the balance wheel assembly constant over a long period, even though the battery voltage declines substantially over this period.

Another problem associated with timepieces of the character described is in providing reliable and maintenance-free means for selectively energizing and de-energizing the electromagnetic coil means which supplies energy for rotating the balance wheel at a constant rate of oscillation. The present invention provides a new and improved impulse-type, electromagnetic motor mechanism in which the switching means is extremely reliable, has a long useful life, and is maintenance-free for the life of the timepiece.

Therefore, it is an object of the present invention to provide a new and improved, direct current, electric timepiece of the character described.

More specifically, it is an object of the present invention to provide a new and improved direct current, electric timepiece which eliminates or greatly reduces the problems mentioned above in connection with prior timekeeping devices.

Another object of the present invention is the provision of a new and improved, direct current, electric timekeeping device employing an escapement wheel assembly having new and improved means associated therewith for insuring that the escapement wheel rotates only a selected degree during each beat or oscillation in synchronism with the balance wheel assembly.

Another object of the present invention is to provide a timepiece having a new and improved balance wheel assembly with means for accurately regulating the beat or oscillation rate thereof and maintaining this rate at a constant value over a long period to insure accurate timekeeping.

Still another object of the present invention is the provision of a new and improved impulse-type, electromagnetic motor means for driving the balance wheel assembly to oscillate at a precisely accurate rate.

Still another object of the present invention is the provision of a new and improved impulse-type, electromagnetic motor means for driving the balance wheel assembly which is unaffected by the fact that the voltage available from the power source may decrease substantially over a period of time.

Further objects and advantages of the present invention will become apparent from the following description, and the features of novelty which characterize the invention will be pointed out with particularity in the claims annexed to and forming a part of this specification.

In accordance with these and many other objects of the present invention, there is provided in one illustrative embodiment thereof a direct current, electric timepiece having a balance wheel assembly including a shaft and two balance wheels mounted on the shaft. Permanent magnet means eccentric of the shaft are mounted on the balance wheel assembly, which is driven to oscillate back and forth with the magnet moving on an arcuate path extending in opposite directions from a neutral or rest position defined on a plane extending radially of the shaft. An electromagnetic coil means is fixed centered on the neutral plane adjacent the path of the magnet means outwardly of the shaft and means are provided for selectively energizing and de-energizing the coil means to successively repel the permanent magnet means on the balance wheel, and thereby provide accurately timed magnetic impulse forces for oscillating the balance wheel back and forth in opposite directions from the neutral position. An eddy current damper is positioned diametrically opposite the coil means and adjacent the path traversed by the magnet means on the balance wheel for opposing the movement of the balance wheel during each oscillation in proportion to the velocity thereof, and thus maintain a constant time period for each oscillation, even though the battery voltage available to energize the coil means may change. New and improved means are provided for regulating the time period of each beat or oscillation of the balance wheel assembly so that precise time will be kept by the timepiece during operation. The balance wheel assembly includes an eccentric impulse pin which drives an escapement wheel connected by a gear train to the hands of the timekeeping device. The escapement wheel is provided with new and improved braking means for limiting the rotational movement in a precisely accurate manner, thereby providing a constant selected degree of rotation of the escapement wheel during each oscillation of the balance wheel assembly.

For a better understanding of the present invention, reference should be had to the following detailed description when taken in conjunction with the drawings, in which:

FIG. 1 is a cross-sectional view of a new and improved timekeeping device constructed in accordance with the features of the present invention taken substantially along line 1—1 of FIG. 2;

FIG. 2 is a plan view of the rearward side of the timekeeping device of FIG. 1;

FIG. 2a is a fragmentary, and elevational view of the timekeeping device looking in the direction of arrows 2a of FIG. 2 and illustrating in detail the time regulator control and handwheel;

FIG. 3 is an isometric view with portions broken away illustrating the balance wheel assembly and time regulator assembly of the timekeeping device;

FIG. 4 is an enlarged, fragmentary, side elevational view illustrating the balance wheel assembly and the impulse-type electromagnetic motor means for driving the same in accordance with the present invention;

FIG. 5a is a schematic diagram graphically illustrating the oscillating movement of the balance wheel assembly in one direction from its neutral position;

FIG. 5b is a schematic diagram graphically illustrating the oscillation of the balance wheel assembly as it moves in an opposite direction continuing through the neutral position;

FIG. 5c is a schematic diagram graphically illustrating the oscillating movement of the balance wheel assembly after it returns to the starting or neutral position completing one full cycle of oscillation;

FIG. 6 is a fragmentary, sectional view of the timepiece illustrating the escapement wheel assembly and braking means for engaging the shaft supporting the escapement wheel;

FIG. 7 is a fragmentary top plan view of a bridge assembly for supporting the electromagnetic coil means and eddy current damper assemblies and illustrating the switching means used in accordance with the present invention for selectively energizing and de-energizing the coil means;

FIG. 8 is a schematic diagram of the electrical circuit used in the timekeeping device of the present invention; and FIG. 9 is an enlarged fragmentary view of a portion of FIG. 6.

Referring now, more particularly, to the drawings, therein is illustrated a new and improved, direct current, electric timekeeping device or clock, referred to generally in FIGS. 1 and 2 by the reference numeral 10. Preferably, the timepiece 10 is a cordless appliance, and direct current, electrical energy for powering the device is supplied from a small battery 11 which is indicated in schematic form in FIG. 8. The clock 10 includes a back plate 12 and a front plate 13 in spaced, parallel relation which are structurally interconnected and maintained in parallel spacing by a plurality of screws or rivets 14 (FIG. 2) which extend through the hollow bores of spacing sleeves (not shown) disposed transversely between the front and back plates. The supporting framework of the timepiece 10, together with the battery 11, is adapted to be contained in a decorative housing or casing (not shown), and for the purpose of mounting these components in the housing, a plurality of grommet-type support bosses 15 (FIG. 2), preferably formed of insulating material, are secured to the front plate 13 and adapted to bear against appropriately located projections formed on the inside wall of the clock housing. The back plate 12 and front plate 13 are constructed from sheet metal or the like and are preferably formed in a stamping operation to the desired shapes with appropriately located holes, slots, and openings therein to support and accommodate various components and parts, to be described hereinafter.

The movement of the timepiece 10 comprises a balance wheel 16 supported for oscillating, rotational motion on a balance shaft or staff 17, and an impulse pin 18 eccentric of the balance staff is mounted on a radially outward extending portion of the balance wheel to drive one end of an escapement lever 19. The escapement lever 19 is supported for oscillatory pivotal movement intermediate its ends on a separate shaft 20, and the outer end portion of the escapement lever is adapted to engage peripheral teeth on an escapement gear or wheel 21 which is mounted on a shaft 22 spaced from the shaft 20. The escapement wheel or gear 21 includes a toothed pinion portion 23 which drivingly engages a first reduction gear 24 integrally formed with a smaller diameter pinion portion 25 and supported on a shaft 26 (FIG. 1).

Referring specifically to FIG. 1, the pinion portion 25 of the first reduction gear assembly drivingly engages a larger second reduction gear 27 having a pinion 28 integrally formed therewith and mounted on a separate shaft member 29. Because the pinion 23 on the escapement wheel shaft 22 has a relatively small number of teeth in comparison to the first reduction gear 24, the first reduction shaft 26 rotates at a slower speed than the escapement wheel supporting shaft 22 and, similarly, the gear portion 27 on the second reduction shaft 29 has a substantially larger number of teeth than the first reduction pinion 25 so that the second reduction gear rotates at a lower r.p.m. than the first reduction shaft 26. The pinion portion 28 mounted on the shaft 29 drivingly engages a third reduction gear 30 which drives and is mounted on a minute shaft 31 mounted for rotation in the axial bore of an hour sleeve 32. The minute drive gear 30 is connected to a pinion portion 33 also carried on the shaft 31 which drivingly engages a larger diameter hour reduction gear 34 mounted on a pinion 35 which is journaled for rotation on the shaft 29. The pinion portion 35 engages an hour hand driving gear 36 which is mounted on and connected to the inner end of the hour hand drive sleeve 32. The minute shaft 31 and hour sleeve 32 rotate at a ratio of 12 to 1 and the outer ends thereof extend outwardly of the front plate 13 so that the clock hands (not shown) can be connected thereto.

In order to set the clock 10, a set shaft 37 spaced radially outward of the hour sleeve 32 is supported in a sleeve or bushing 38 mounted on the back plate 12 of the timepiece frame. The set shaft projects outwardly of the back plate and a suitable knob (not shown) is mounted thereon to facilitate turning of the shaft so that a set gear 39 mounted at the inner end of the shaft can be brought into engagement with the gear 30 to set the hands of the clock. When in the nonsetting position, as indicated in solid lines in FIG. 1, the setting gear 39 is at rest adjacent the front plate 13 with its hub portion 39a projecting into an opening 40 provided in the front plate 13 and axially aligned with the bore of the sleeve 38 which supports the set shaft. In order to set the hands of the timepiece, the set shaft is retracted rearwardly, as indicated by the arrow "A" (FIG. 1) until the teeth of the set gear engage the teeth on the gear 30 which drives the minute shaft. The setting position is shown in dotted lines in FIG. 1, and when the set shaft is rotated (arrow "B"), the minute and hour hands of the clock are set for the proper time. After proper setting of the clock has been completed, the set shaft is moved inwardly until it is returned to the nonengaging position, as shown in solid lines in FIG. 1.

The sleeve or bushing 38, which supports the set shaft, is preferably constructed of plastic material and is formed like a grommet for seating or staking in an opening 41 formed in the back plate 12.

The rearward end of the minute shaft 31 is supported in a grommetlike bearing or bushing sleeve 42 having a hollow bore and seated or staked in an opening 43 provided in the back plate 12; however, the forward portion of the minute shaft is supported for rotation within the hollow bore of the hour hand sleeve 32 which is supported in a large grommetlike bearing sleeve 44 seated or staked in an opening 45 formed in the front plate 13 in coaxial alignment with the opening 43 in the back plate 12. The second reduction shaft 29 is supported at its opposite end portions by a pair of hollow grommetlike bearing members 46 and 47 mounted in coaxial alignment and staked into openings 48 and 49 formed in the back plate 12 and front plate 13, respectively. Similarly, the first reduction shaft 26 is supported at its opposite end portions by a pair of grommetlike bearing members 50 and 51 seated or staked in coaxial openings 52 and 53, formed in the back plate and front plate, respectively. The escapement wheel shaft 22 is rounded at its opposite ends and is supported for rotation by a pair of grommetlike bearing members 54 and 55 seated or staked in coaxially aligned openings 56 and 57, formed in the back plate and front plate, respectively. The shaft 20, which carries the escapement lever 19, is supported for rotation at its opposite ends by a pair of grommetlike bearing members 58 and 59 seated or staked in openings 60 and 61, in coaxial alignment with one another on the back plate and the front plate, respectively.

The balance wheel shaft or staff 17 is supported at opposite ends for oscillating rotative motion about its longitudinal axis by a pair of hollow grommet-like sleeve members 62 and 63 seated or staked in coaxially aligned circular openings 64 and 65 formed in the back plate and front plate, respectively. The sleeve members 62 and 63 are provided with internally threaded axial bores in order to support externally threaded, adjustable bearing members 66 and 67 which are threadedly engaged within the bores and adjustable axially therein to achieve the desired low friction, supporting contact with the opposite ends of the balance staff 17. The bearing member 67 includes a headed outer end portion having a radial slot therein to accommodate a screw driver or similar tool used for turning the bearing member for axial adjustment within the bore of its supporting grommet-like bearing sleeve 63. The inner end surface of the bearing member 67 is provided with a conically shaped recess centered thereon in order to support one conically shaped pointed end portion 17a of the balance wheel staff. The bearing member 66 is also axially adjustable within the bore of the grommet-like sleeve member 62 and has a radial slot on the outer end surface for accommodating a screw driver during adjustment. The inner end of the bearing 66 is formed with a cylindrical recess therein in which is seated a jewel bearing 68 having a centered conical bearing recess to accommodate the opposite end portion 17b of the balance wheel staff which is conical in shape. By axial adjustment of the bearing members 66 and 67 in the bore of their respective supporting grommets 62 and 63, end pressure on the balance wheel staff 17 can be accurately set, and once the proper bearing pressure is set, permanent cement is used to prevent turning of the bearings in the bores of their supporting grommet members. Preferably, all of the grommet-like sleeves and bearing members mentioned hereinbefore are formed of plastic material, such as nylon or the like, and are injection molded into the respective apertures in the front and back plates of the timepiece framework in the manner disclosed in Jepson et al. Pat. 3,248,867. These plastic members require no lubrication, and the shafts supported thereby turn freely without maintenance or attention. The bearing 67 supporting the front end 17a of the balance wheel staff is formed of steel.

The balance wheel 16 and balance staff 17 are driven to oscillate back and forth in rotary motion about the longitudinal axis of the balance staff at a continuous and constant rate of 240 beats or 120 complete cycles per minute. In order to supply the power to initiate and sustain continuous oscillation of the balance wheel and staff, an annular electromagnetic coil 69, having a relatively large number of turns of fine wire, is fixedly mounted with its end faces parallel and adjacent to one side of each balance wheel. The coil 59 is energized and de-energized in synchronism with the oscillations of the balance wheel assembly, thereby creating a magnetic field which successively expands and collapses. When the coil is energized, the magnetic field produces a resultant force vector extending coaxially of the hollow center of the coil as represented by the arrow "C" (FIG. 4), and because direct current is used to energize the coil, the resultant force vector produced is of the same polarity on each successive cycle; for example, the head end of the arrow "C" may represent the north pole of the magnetic impulse, while the tail end represents the south pole.

In accordance with the present invention, a circular disc shaped magnet 70 of permanently magnetic material is mounted on the balance wheel radially outward of the balance staff 17, and the disc-shaped magnet 70 includes planar opposite end faces. The magnet is orientated with respect to the coil 69 so that one end face, for example, representing the north pole thereof, is disposed adjacent the head end portion of the coil force vector and, accordingly, when the coil is energized, the lines of magnetic flux formed by the coil and the lines of flux of the magnet tend to repel each other. This results in a disc-shaped magnetic force impulse exerted on the movable magnet 70 carried on the balance wheel 16, and consequently the balance wheel is caused to rotate so that the disc-shaped magnet 70 moves in one direction or the other away from a neutral or centered position wherein the magnet is in its closest proximity to the coil 69. In order to more effectively utilize the magnetic repelling forces available for rotating the balance wheel assembly, a second balance wheel or disc 71 is mounted on the balance staff 17 in spaced parallel relation with the balance wheel 16, and a circular magnetic disc-shaped magnet 72 is mounted thereon with its south pole face disposed to face the opposite end of the coil 69. The lines of force from the disc-shaped magnet 72 react with the magnetic force of the coil represented by the resultant vector "C" to add impulse force for oscillating the balance wheel assembly.

The permanent disc-shaped magnets 70 and 72 move in arcuate paths lying on parallel, radial planes disposed adjacent opposite end faces of the coil 69 and closely adjacent thereto, so that each time the coil 69 is energized, the magnets are repelled and, consequently, the balance wheel assembly is caused to oscillate about the axis of the balance staff 17.

Referring now, more specifically, to FIGS. 5a, 5b, and 5c, FIG. 5a represents the balance wheel 16 at a starting or neutral position, wherein the permanent magnets 70 and 72 are disposed directly above and below the respective opposite end faces of the fixedly positioned coil 69. When the coil 69 is initially energized, the magnets are repelled and the balance wheel assembly is caused to rotate in one direction or the other away from the rest or neutral position. As indicated in FIG. 5a, for example, if the initial rotation is in a clockwise direction, the balance wheel will rotate approximately 270° until reaching the "nine o'clock" position, at which point the rotation will cease, as explained hereinafter.

From the nine o'clock position, the balance wheel assembly will rotate in a counterclockwise direction back to the starting or neutral position but will continue on past the neutral position in a counterclockwise direction (FIG. 5b) for approximately 270° until it reaches the "three o'clock" position, at which point rotation will cease, as explained hereinafter. From the three o'clock position (FIG. 5c) the balance wheel assembly will rotate in a clockwise direction back to the neutral or starting position and will continue on past this position to the nine o'clock position. From the foregoing, it will be seen that the amount of rotation in each direction is approximately 540° or 1½ turns, and once oscillation is started it will continue in this manner on repeated cycles until the power source is disconnected or the battery 11 is dead. As previously indicated, the time elapsing during an oscillation or beat in each direction is approximately 540° or 1½ turns and is adjusted to be 1/240 of a minute and, accordingly, the balance wheel assembly could be said to complete 120 cycles per minute, wherein a complete cycle comprises two successive beats or oscillations of opposite direction. The driving interconnection between the balance wheel assembly and the minute and hour hands of the clock is designed with the proper gear ratios to produce the desired amount of hand movement around the clock face based upon the above described rate of balance wheel oscillation.

In order to limit the amount of rotation of the balance wheel in either direction from the neutral position to less than a whole turn, a spirally wound hairspring 73 is interconnected between the balance staff 17 and the back plate 12 with the inner end of the hairspring being connected to an annular collet 74 secured to the balance staff (FIG. 4). The hairspring includes a plurality of spiral convolutions extending radially outwardly of the collet, as best shown in FIGS. 1, 2, and 3, and the outer end of the outermost convolution of the hairspring 73 is fixedly connected to the back plate by a wedge member 75 which is inserted into a rectangular opening 76 formed in a downturned tab portion 12a of the back plate extending toward the front plate 13 (FIG. 3). Accordingly, when the magnetic impulse force exerted on the balance wheel assembly causes it to rotate away from the neutral position, for example, in counterclockwise direction, the hairspring 73 is uncoiled and absorbs the energy of the impulse until the torque exerted on the balance staff 17 thereby overcomes the momentum of the wheel assembly. The spring 73 is of a strength so that rotation is stopped after approximately 270° of rotation from the neutral position. When rotation ceases at either the three o'clock or nine o'clock position, the stored energy in the hairspring 73 reverses the direction of oscillation and the balance wheel begins to rotate in the opposite direction, as indicated diagrammatically in FIG. 5b. During this time the previously uncoiled hairspring begins to recoil, thereby increasing the momentum of the balance wheel to carry the magnets 70 and 72 past the coil 69 at the neutral position. As the magnets approach the neutral position, the coil is energized momentarily, and the resultant repelling magnetic force, together with the momentum of the balance wheel, causes continued rotation past the neutral position (FIG. 5b) in a counterclockwise direction toward the three o'clock position. During this period, the hairspring is being coiled tighter than normal and absorbs energy until the torque of the hairspring balances the remaining impulse momentum in the balance wheel 16. At this point rotation ceases and clockwise oscillation commences.

From the foregoing, it will be seen that the hairspring 73, in cooperation with coil 69, causes the balance wheel 16 to oscillate back and forth, and the hairspring is continuously storing and releasing energy to smooth the movement of the balance wheel and limit the amount of rotation from a neutral position to less than one complete revolution or turn in either direction. Rotation movement of the balance wheel in one direction is termed as a beat, while a cycle of operation includes two successive beats comprising rotation in opposite directions for a total of approximately 540° of angular movement.

In many prior art electric clocks and timepieces, the means for oscillating the balance wheel consists of a spring member which is periodically wound up by an electric motor. In the present invention, the power for oscillating the balance wheel on a continuously synchronized basis is supplied by the electromagnetic coil 69 which is fixedly positioned radially outward of the shaft 17 between the magnets 70 and 72 when the balance wheel is in a neutral position. Opposite end faces of the coil are preferably spaced equidistant from the respective north and south pole faces of the magnets so that endwise force couples on the staff are negligible. A fixed support for the coil 69 is provided by a flat bridge member 77 (FIG. 7) which is constructed of insulating material, such as plastic. The bridge is shaped as shown and includes a circular opening 78 for receiving the coil.

In accordance with the invention, the electromagnetic coil is only energized during a small fraction of the time period of a beat or oscillation, during which time the balance wheel 16 is centered on or closely adjacent in either direction to the neutral plane. In order to provide switching action synchronized with the oscillation of the balance wheel assembly for successively energizing and de-energizing the coil 69, a contact pin 79 eccentric of the balance staff 17 is mounted on the balance wheel 16, as best indicated in FIGS. 4, 7, and 5a, b, and c. The contact pin 79 is parallel to the balance staff and is adapted to make and break connection with a springlike contact blade or wire 80 during each beat or oscillation of the balance wheel assembly. The contact blade 80 is fixedly supported at its outer end by a post member 81 and projects inwardly into the path of movement of the contact pin. As best indicated in FIG. 4, the contact pin 79 extends from the balance wheel 16 in a direction opposite the impulse pin 18 and, as best shown in FIG. 7, is angularly offset therefrom so that when the balance wheel 16 is in the neutral position, as shown in FIGS. 5a and 7, contact is made between the contact pin 79 and the contact blade 80.

Referring momentarily to FIGS. 2, 7, and the schematic diagram of FIG. 8, the battery 11 is connected to the coil 69 via a lead 82, one end of the lead wire 82 being connected to one terminal of the battery 11, and the other end being secured to a first solder terminal 83 mounted on the bridge member 77. The coil 69 includes an outer coil lead 69a connected to the terminal 83 and an inner lead 69b connected to a second solder terminal 84 spaced from the terminal 83 and also mounted on the bridge member. A battery lead 85 having one end connected to a second or opposite terminal of the battery 11 is connected to the back plate 12 of the timepiece at the lower screw 14 (FIG. 2) and, accordingly, the contact pin 79 is always maintained at the potential of the second terminal of the battery by virtue of the fact that the pin 79 is electrically connected to the balance wheel 16 which, in turn, is electrically connected to the balance staff 17. The end surface 17a of the staff is supported by and in contact with the steel bearing 67 which is threadedly engaged in the plastic grommetlike member 63, which is seated on the front plate 13 of the timepiece. The electrical connection between the balance staff and the back plate 12 is made through the annular metal collet 74 and the hairspring 73, the end of which is inserted in the opening 76 of the down-turned tab portion 12a of the back plate 12.

The contact support post 81 is constructed of conductive metal and is staked onto the bridge 77 so that a hexagonal head portion is spaced above the bridge to support the outer end of the contact blade 80. The hexagonal head portion of the contact post is provided with a radial slot in its upper surface, and the outer end of the contact blade member is staked within the radial slot and is thereby in electrical contact with the post. As shown in FIG. 7, an outer end portion of the contact member 80 is provided with a coating of resilient material 86 to dampen out vibrations of the contact blade. Preferably, the contact member 80 is constructed of material, such a gold or the like, having a high electrical conductivity so that excellent electrical contact will be established between the blade and the moving contact pin 79 on the balance wheel 16. The contact member 80 is thus supported in a cantilever fashion so that the free end thereof which projects into the path traversed by the contact pin 79 is free to deflect or move with the pin until contact is broken. In FIG. 7, the contact blade 80 is illustrated in solid lines in its neutral or nondeflected position and is movable or deflectable in opposite directions from the neutral position as indicated in phantom with the maximum amount of deflection being shown as the angle "X."

From the foregoing it is seen that once the contact pin 79 touches the outer end of the contact blade 80 to make connection therebetween, the connection is maintained for a short period regardless of the direction of movement of the contact pin. During this period, which is only a small fraction of the time duration of a single beat, the coil 69 is energized and the contact pin and blade are oriented with respect to the assembly so that the brief period of contact occurs only when the magnets 70 and 72 on the balance wheel assembly are within a short range of a few degrees either side of the neutral position.

Continuing with the circuitry of the timepiece 10, connection between the solder terminal 84 and the contact post 81 is made by a short jumper wire 87 soldered at opposite ends to the respective members to complete the electrical path. Accordingly, any time that the moving contact pin 79 is in contact with the free or outer end portion of the contact blade 80, a circuit is completed between the battery 11 and the coil 69, thereby energizing the coil to provide the electromagnetic field previously described and represented by the arrow "C" in FIG. 4. The brief time period during which the coil is energized is only a small fraction of the time required for a beat or oscillation of the balance wheel, so that energy is being supplied by the battery 11 for only a fraction of a second. The energy supplied by the battery is more than enough to provide the necessary power to counteract frictional losses in the clock mechanism and maintain oscillation of the balance wheel moving at a continuously constant rate. Moreover, since the battery power required is very small and is supplied only for extremely brief periods, energy of the battery 11 is conserved and long battery life is assured.

In order to prevent a build-up of voltage across the coil terminals caused by induced EMF, each time that the contact pin 79 breaks contact with the switch blade 80, a diode 88 is connected across the coil leads 69a and 69b with leads 88a and 88b of the diode being soldered to the terminals 83 and 84, as best shown in FIG. 7. The diode 88 provides a direct shorting path for current caused by the induced EMF when contact is broken and, consequently, arcing between the contact blade 80 and the contact pin 79 is minimized.

The hairspring 73 is adjusted or regulated so that the balance wheel assembly and magnets 70 and 72 mounted thereon are centered adjacent the opposite ends of the coil 69 when the balance wheel is in a neutral position and no current is being supplied to the coil 69, and in this position no torque is exerted on the balance staff 17 by the hairspring. When the coil is initially energized by insertion of the battery 11, the contact pin 79 is engaging the switch blade 80 so that the coil is energized, repelling the magnets 70 and 72, thereby initiating oscillation of the balance wheel assembly. After the balance wheel has moved away from the neutral position in either direction by a few degrees, contact is broken between the contact pin 79 and spring contact blade 80, and the coil 69 is deenergized, collapsing the magnetic field. The initial magnetic impulse force acting on the balance wheel assembly starts the clock in operation, which continues until the battery is disconnected or becomes dead. Each time the magnets 70 and 72 approach the neutral position, the contact pin 79 makes momentary contact with the contact blade 80 which again energizes the coil 69 for a brief period, as described, to supply the energy needed for continued oscillation of the balance wheel assembly.

Over a relatively long period of time, the voltage available from the battery 11 gradually decreases and means are provided for insuring that the oscillation or beat rate of the balance wheel assembly does not change or decrease correspondingly. For this purpose, an eddy current damper 89 constructed of electrolytic copper and circular in shape is mounted on the bridge member 77 in a position diammetrically opposite the position of the electromagnetic coil 69 with respect to the balance shaft 17. As best shown in FIG. 2a, the eddy current damper 89 is spaced between the parallel paths of travel of the pole faces of the respective magnets 70 and 72 on the balance wheels, and the damper includes a central, downwardly extending stem portion 89a which is seated and secured in a circular opening 90 formed in the bridge member 77. During oscillation of the balance wheel assembly, the permanent magnets 70 and 72 pass above and below the eddy current damper 89, and eddy currents are induced therein which in turn create magnetic fields opposing the fields of the moving magnets which have induced the eddy currents in the damper. These opposing fields are of a strength in direct proportion to the velocity of the moving fields of the magnets 70 and 72 and, consequently, if the velocity of the magnets approaching the damper is high, the opposing fields developed by the eddy currents in the damper are correspondingly high. As the velocity of oscillation decreases, likewise the force of the opposing field developed by the eddy currents in the damper decreases correspondingly. The eddy current damper 89 thus provides damping forces which tend to retard or limit the angular range of oscillation of the balance wheel in direct proportion to the velocity at which the magnets approach and pass by the damper which, in turn, is in proportion to the impulse force initially supplied by the electromagnetic field of the coil 69. Accordingly, when the battery 11 is fresh and the voltage is high, the electromagnetic force supplied by the coil 69 is somewhat greater than it is after a period of time when the voltage of the battery has dropped off or decreased. However, the increased strength of the impulse forces from a fresh battery is opposed by correspondingly stronger damping forces developed by the eddy current damper 89, and accordingly the rate of oscillation of the balance wheel assembly is held constant even though the battery voltage gradually declines. The energy impulses supplied by the coil 69 to oscillate the balance wheel assembly when the battery is fresh are substantially greater than actually required to sustain oscillation, and this excess energy is absorbed by the eddy current damper 89 and dissipated in the form of heat. As the battery strength declines, the strength of the impulses decreases and, correspondingly, the energy dissipated in the damper is less. The eddy current damper tends to hold the amplitude constant and hence the rate constant. It also permits the use of a more powerful motor.

Assembly of the balance wheel is one of the important factors in providing accurate timekeeping of the clock 10. After the balance wheel 16 and the second balance disc 71 have been mounted on the balance staff 17, the magnets 70 and 72 are properly aligned and secured onto the respective balance wheels. The entire assembly is then poised or balanced to insure that an even and constant rate of oscillation is achieved even though the exact amplitude or angular degree of oscillation may vary from balance wheel to balance wheel. Furthermore, poising is desired so that each balance wheel assembly will offer the least resistance to starting oscillation when the battery is first connected and to insure that the most nearly possible constant rate of oscillation is maintained during operation, regardless of orientation or position of the clock with respect to the earth's surface. Poising is accomplished by removing material from the heavier side of the balance wheel when the assembly is placed with the balance shaft 17 in a horizontal position on a pair of small jeweled rail surfaces disposed adjacent opposite ends 17a and 17b of the balance staff. Since the jeweled rails offer very little frictional resistance, the balance wheel assembly will come to rest with its heavier side down. Material is then removed from portions on the heavier side of the balance wheel 17 or balance wheel disc 71, until finally when the balance wheel is placed on the rails it stays in the same position.

The hairspring 73 is an extremely important part in providing for accurate timekeeping, and slight variations in the thickness and width of the hairspring or in the inertia or balance of the balance wheel assembly associated therewith may cause large variations in the rate of oscillation. Because of this, the hairsprings are carefully constructed and are cut to length slightly longer than will be ultimately required when assembled with a balance wheel. Each hairspring is individually checked to determine the correct length needed for a particular balance wheel assembly with which it will be used. Determining the proper length of the hairspring is referred to as "vibrating a hairspring." After a balance wheel assembly has been poised, as previously described, a hairspring 73 and collet 74 are pressed onto the balance staff 17. The angular relationship of the free end of the hairspring and the impulse pin 79 is not critical at this time because the end of the hairspring may be trimmed off at a later time. With the balance staff 17 in an upright or vertical position, the outer convolution or coil of the hairspring is grasped between two rolls. During this procedure, the lower end of the balance staff rests lightly upon a highly polished surface and rotary motion is imparted to the balance wheel by a jet of air or similar means. The rotary motion produced is adjusted to be substantially equivalent to the motion or oscillation amplitude desired for the balance wheel assembly when driving the clock as described and is approximately one and one-half turns or 540° of rotation in each direction at a rate of 240 beats per minute. This is accomplished by moving the rolls which are grasping the outer convolution of the hairspring to thereby change the effective length of the hairspring. The point of support by the rolls on the outer turn of the hairspring that produces the desired beat rate is termed "the vibrating point." It is this point on the hairspring that is secured in the slot or opening 76 in the back plate tab 12a when the outer end of the hairspring is finally connected. The outer end of the hairspring is then trimmed to the desired length at a point past the vibrating point, and the collet 74 is rotated on the balance shaft until the desired angular relation between the outer end of the hairspring and the impulse pin 79, as shown on the drawings, is obtained.

In order to regulate or adjust the oscillation or beat rate on the balance wheel assembly and hairspring 73 after installation, so that the clock 10 will keep accurate time, there is provided an annular regulator member 91 which is rotatably mounted on the large bearing grommet 62 supporting one end of the balance staff 17, as best shown in FIGS. 1, 2, 2a, and 3. The regulator 91 includes a radially outwardly projecting L-shaped arm portion 91a (FIG. 2) and an outwardly projecting arcuate gear segment 91b having a plurality of gear teeth thereon. As best shown in FIG. 1, the gear segment 91b slopes upwardly away from the outer surface of the back plate 12 so that the teeth thereon may engage one or more convolutions formed on a worm gear regulator shaft 92 supported for rotation on the back plate 12. The inner end of the shaft is supported by a bearing block 93 secured to the back plate 12, and the outer end portion of the worm shaft is similarly supported by a bearing block 94 spaced on the opposite end of the worm convolutions on the shaft. The shaft includes an outer end portion projecting outwardly from the edge of the back plate 12 with a hand wheel 95 mounted thereon (FIG. 2a) which has appropriate indicia and arrows embossed thereon indicating the direction of rotation of the hand wheel to slow down or speed up the clock movement. The outer edge of the hand wheel is serrated, as shown, to permit easy manipulation and rotation thereof to turn the worm shaft 92 and rotate the regulator 91 around the support grommet 62. The indicia and markings on the outer face of the hand wheel 95 are positioned adjacent a window or opening in the casing or enclosure of the timepiece (not shown) so that these indicia can be readily seen when adjustment of the regulator is being made.

As the hand wheel is manually rotated in either direction, the gear sector 91b of the regulator 91 is driven to rotate at a much slower rate because of the large gear reduction between the worm shaft and the regulator. As best shown in FIG. 1, a coil spring 96 is mounted with its coils around an inwardly extending, annular recess formed in the bearing grommet 62, and the spring coils urge the regulator against the outer surface of the back plate 12. The coil spring 96 includes a pair of radially outwardly extending legs 96a and 96b at opposite ends of the coiled portion, which act to exert resilient torque on the regulator 91 in a clockwise direction (FIG. 2) and, accordingly, the teeth on the gear section 91b are forced against the worm or thread on the shaft 92 to prevent it from turning. As shown in FIG. 2, one spring leg 96a bears against an edge portion of the back plate 12, while the other spring leg 96b engages the L-shaped arm portion 91a of the regulator, effecting the clockwise bias. When the hand wheel 95 is rotated in one direction, the spring is coiled more tightly and when the hand wheel is rotated in an opposite direction, the spring unwinds but always maintains a positive force between the teeth on the gear sector 91b and the worm of the shaft 92 without any backlash.

In order to increase or decrease the effective length of the hairspring 73, a hair spring guide member 97 of U-shaped configuration engages the outermost convolution or turn of the hairspring. The inner leg of the hairspring guide 97 projects downwardly from and is secured to the L-shaped arm 91a of the regulator 91, and this leg contacts the inside surface of the outermost coil of the hairspring 73 while the outer leg portion of the hairspring guide extends upwardly towards the regulator arm but is somewhat shorter and is spaced outwardly of the hairspring. Because the hairspring guide 97 is fixed at a constant radius from the axis of the balance staff 17, rotation of the regulator 91 in either direction changes the position along the hairspring of hairspring guide 97 and thereby increases or decreases the effective length of the hairspring and the torque exerted thereby on the balance wheel assembly. Preferably, the hairspring guide 97 is made of round wire to provide for a smooth, low friction contact with the hairspring 73 so that no hang-up or binding will occur during adjustment of the regulator. In this manner free movement of guide 97 longitudinally of the hairspring is insured so that as the regulator is turned only the position along the hairspring of guide 97 is changed, thus changing the effective length of the hairspring, but no longitudinal pull is exerted on the hairspring.

When proper poising of the balance wheel assembly and vibration of the hairspring have been accomplished and the regulator 91 is installed and set in a position midway between the spring leg 96a and the outer end of the hairspring attached to the back plate tab 12a, the balance wheel assembly will oscillate at approximately the desired rate of 240 beats per minute. Subsequent turning of the regulator 91 in either direction to the maximum limits will provide a large range of regulation, which includes the precise point that will effect the desired beat rate of 240 beats per minute.

As the balance wheel 16 oscillates at the desired rate, the impulse pin 18 eccentric of the balance staff 17 oscillates in a similar manner, and on each oscillation engages the inner end of the escapement lever 19, moving the lever from one side of dead center to the other. As best shown in FIG. 7, the inner end of the escapement lever is formed with a longitudinal slot 98 to receive the pin 18, and slightly convex flanking surfaces 99 are provided on opposite sides of the slot 98 to form a pair of laterally projecting ear portions 19a which are engaged by the oscillating impulse pin 18 as it approaches the limit of oscillation in either direction. When the inner end of the lever 19 is disposed to one side of the dead center axis between the shaft 20 and balance staff 17 and the pin 18 is moving in a clockwise direction, the pin moves into the open end of the slot 98 and carries the inner end of the lever across the dead center position toward the opposite side of the balance staff to the position shown in phantom in FIG. 7.

During this period, the escapement lever 19 pivots about the axis of its supporting shaft 20 in a precise angular amount. The lever remains in the position shown in phantom in FIG. 7, as the pin 18 continues in its clockwise oscillation and leaves the slot 98 in the end of the lever. The pin 18 continues in a clockwise direction until reaching the end or limit of its oscillation swing, at which time it touches or closely approaches the righthand convex surface 99 (FIG. 7) flanking the slot 98 in the inner end of the lever. Engagement between the pin 18 and the flanking surfaces 98 positively limits the amount of angular movement on each oscillation of the balance wheel assembly, and the pin then moves in a reverse direction. As the pin moves in a counterclockwise direction around the balance staff 17, it enters the open end of the slot 98 and carries the inner end of the escapement lever back across dead center to the position shown in solid lines. The lever 19 is thus pivoted in a clockwise direction by a precise angular amount and the cycle, as described, is then repeated. Thus, on each oscillation of the balance wheel assembly in a given direction (about 540°), the escapement lever 19 is driven to pivot about the axis of the shaft 20 in an opposite direction, and it is pivoted through a much smaller arc or degree of angular movement (approximately 10°).

The balance staff is formed with a slotted out section 100 to accommodate the inner end of the escapement lever 19 without interference, and the slotted out portion 100 permits the lever to move freely across the dead center position from one side to the other of the balance staff. Each time the lever 19 is driven from one side of dead center to the other, as described, the escapement wheel or gear 21 is driven by the opposite end of the lever to advance in one direction only by an angular distance equal to one-half the pitch distance of the teeth on the escapement wheel.

In order to effect the desired driving engagement between the outer end portion escapement lever 19 and the escapement wheel 21, so that the wheel will be driven in one direction only in response to oscillation of the lever in both directions, the teeth on the periphery of the escapement wheel are formed with flatted surfaces 101 on one side only adjacent their ends. The surfaces 101 are adapted to be engaged by similarly slanted outer end surfaces 102 which are formed on a pair of spaced apart, outwardly projecting lugs 103 formed on arcuate outer end portions 104 of the escapement lever. Because of the spacing between the balance staff 17, escapement lever shaft 20, and escapement wheel shaft 22, each oscillation of the lever in either direction causes one or the other of the projections 103 to move inwardly towards the shaft 22 supporting the escapement wheel 21, and during this inward movement the surface 102 of a lug 103 engages the flatted surface 101 on a tooth of the escapement wheel 21, thereby driving the wheel in one direction to rotate in an amount equal to one-half the pitch distance between adjacent teeth thereon. When one of the lugs 103 is engaging the teeth on the escapement wheel 21, the other lug is out of engagement, and as the one lug is withdrawn from engagement by pivotal movement of the escapement lever, the other lug moves into a tooth-engaging position and advances or rotates the escapement wheel a precise degree of angular rotation, always in the same direction of rotation regardless of which of the lugs 103 is engaging the escapement wheel. The end portions 104 project to engage the escapement wheel 21 to limit the extent to which the associated lug 103 may penetrate between the teeth of the escapement wheel. An important feature of the present invention is the fact that escapement lever 19 is formed as a flat stamping with the lugs 103 in the plane of the stamping.

One of the problems associated with prior timepieces is in providing for a precise degree of rotation of the escapement wheel during each oscillation of the balance wheel assembly. Because of frictional forces and momentum, the escapement wheel sometimes moves more than the desired, precise amount of angular rotation, thereby making these timepieces inaccurate. In accordance with the present invention, spring 105 is provided to bias one end of the escapement wheel shaft 22 in an axial direction only toward the grommet bearing 55 and, accordingly, no rotational torque eccentric loading is exerted on the shaft 22 by the spring. The axial biasing force of the spring is selected so that the escapement wheel 21 is effectively braked and does not continue to rotate past the desired limit, yet the force is small enough that the wheel will rotate the full amount to the limit on each stroke or oscillation of the escapement lever 19. As best shown in FIGS. 1, 2, 3, and 6 the bearing grommet 54 is provided with a radially extending slot or groove 106 in the outer face thereof and the spring 105 is seated in the slot to bear against the end of the shaft. The spring projects outwardly in opposite directions from the shaft 22 and has one end seated in an opening 107 (FIG. 2) formed in the back plate 12. The opposite end portion of the spring 105 projects through a rectangular opening 108 in the back plate 12, and a short, upstanding tang portion 105a at one end of the spring projects upwardly through a circular opening 109 spaced outwardly of the opening 108 to help lock the spring in place. In an unstressed condition, the body of the spring 105 is normally flat and when installed in the timepiece the spring is flexed (as best shown in FIG. 6), thus exerting axial end thrust on the escapement wheel shaft 22 in the direction of the arrow "D." This force urges the shaft toward the bearing member 55 and thus exerts an axially directed pinching or braking pressure on the shaft which effectively brakes the shaft against overtravel. The bearing 55 is formed with a conical surface at the inner end of the bore therein, as best shown in FIG. 9 of the drawings, and the rounded lower end of the shaft 22 bears against this surface to provide small but constant frictional resistance to turning. Likewise, the opposite end of the shaft 22 is rounded so that the biasing force exerted by the spring 105 is centered along the axis of rotation of the shaft, and thus no eccentric braking torque is exerted thereon. This results in more accurate timekeeping than possible with prior devices, wherein a braking spring exerting forces eccentric of the escapement wheel shaft is utilized.

From the foregoing description it will be seen that the timekeeping device 10 of the present invention provides many advantageous features and is extremely accurate and precise in its timekeeping function. The new and improved balance wheel assembly and hairspring arrangement require a minimum of battery drain, resulting in long life for batteries. New and improved means are provided for accurately regulating the rate of oscillation of the balance wheel assembly to provide extremely accurate timekeeping. Moreover, the device includes a unique eddy current means insuring that the timekeeping function is accurate, even though the battery voltage gradually declines during use. Precise rotation of the escapement wheel is insured by the new and improved braking spring arrangement, further insuring accuracy of the device.

While there has been shown and described a particular embodiment of the present invention, it will be apparent to those skilled in the art that various changes and modifications may be made without departing from the invention in its broader aspects, and it is therefore contemplated in the appended claims to cover all such changes and modifications as fall within the true spirit and scope of the present invention.

What is claimed as new and desired to be secured by Letters Patent of the United States is:

1. In the timekeeping device, the combination comprising a balance wheel assembly having a rotatable shaft and a pair of spaced apart radial balance wheels mounted thereon, permanent magnet means mounted on each of said balance wheels outwardly of said shaft and including pole faces disposed in spaced apart facing relation, electromagnetic coil means fixedly mounted radially outwardly of said shaft and including opposite end faces disposed between the paths of movement of said pole faces of said permanent magnet means on said balance wheels, and circuit means for selectively energizing and de-energizing said coil means to repel said permanent magnet means, thereby causing said balance wheel assembly to oscillate about the axis of said shaft, said circuit means including a switch contact movable in response to the rotational position of said balance wheel assembly to effect switching action.

2. The timekeeping device of claim 1 including hairspring means connected with said shaft for storing energy received from said shaft during oscillation away from a neutral position and releasing said energy to said shaft during oscillation toward said neutral position.

3. The timekeeping device of claim 2 wherein said neutral position is defined by a radial plane bisecting the longitudinal axis of said shaft, said coil means having its major force axis disposed on said plane outwardly parallel of said shaft, and the major magnetic force axes of said permanent magnet means being movable through said force axis of said coil means and said plane about a circular path concentric of said shaft.

4. The timekeeping device of claim 2 wherein said pole faces are equidistantly spaced from and parallel to the opposite ends of said coil means when said balance wheel assembly occupies said neutral position.

5. In the timekeeping device, the combination comprising a balance wheel assembly having a rotatable shaft and a pair of spaced apart radial balance wheels mounted thereon, permanent magnet means mounted on each of said balance wheels outwardly of said shaft and including pole faces disposed in spaced apart facing relation, electromagnetic coil means fixedly mounted radially outwardly of said shaft and including opposite end faces disposed between the paths of movement of said pole faces of said permanent magnet means on said balance wheels, and circuit means for selectively energizing and de-energizing said coil means to repel said permanent magnet means, thereby causing said balance wheel assembly to oscillate about the axis of said shaft, said circuit means comprising battery means connected to said coil means through mechanical switch means, said switch means comprising a contact pin on said balance wheel assembly eccentric of and parallel to said shaft and a resilient contact arm having a free end portion extending across the path traversed by said pin during oscillation of said balance wheel assembly to make and break connection to said coil means.

6. The timekeeping device of claim 5 wherein said contact arms are fixedly supported adjacent their opposite end position.

7. The timekeeping device of claim 5, including resinous damping material against said arm adjacent said opposite end portion thereof for dampening oscilaltion of said member as contact is made and broken with said pin.

8. The timekeeping device of claim 5 wherein said switch means is operable to energize said coil means only when said balance wheel is within a selected degree of angular range with respect to said neutral position.

9. The timekeeping device of claim 5 wherein said pin is mounted on said balance wheel at a point angularly spaced from said permanent magnet means.

10. In the timekeeping device, the combination comprising a balance wheel assembly having a rotatable shaft and a pair of spaced apart radial balance wheels mounted thereon, permanent magnet means mounted on each of said balance wheels outwardly of said shaft and including pole faces disposed in spaced apart facing relation, electromagnetic coil means fixedly mounted radially outwardly of said shaft and including opposite end faces disposed between the paths of movement of said pole faces of said permanent magnet means on said balance wheels, circuit means for selectively energizing and de-energizing said coil means to repel said permanent magnet means, thereby causing said balance wheel assembly to oscillate about the axis of said shaft, said circuit means comprising battery means connected to said coil means through mechanical switch means, said switch means comprising a contact pin on said balance wheel assembly eccentric of and parallel to said shaft and a resilient contact arm having a free end portion extending across the path traversed by said pin during oscillation of said balance wheel assembly to make and break connection to said coil means, an impule pin mounted on said balance wheel eccentric of said shaft and angularly offset from said switch pin, and an escapement lever pivotally supported eccentrically of said balance wheel shaft and including an inner end engageable with said impulse pin upon each oscillation of said balance wheel, said lever including an outer end having a plurality of teeth thereon, and an escapement wheel assembly including a rotatably mounted gear having teeth around the periphery thereof adapted to be engaged by said teeth on said lever to rotate said escapement wheel by a selected amount upon each oscillation of said balance wheel.

11. The device of claim 10 including eddy current damper means positioned diametrically opposite said coil means and between the paths traversed by said magnet means for opposing the movement thereof as said balance wheel assembly oscillates.

12. The timekeeping device of claim 11 wherein each of said balance wheels includes a balance portion of magnetizable material extending radially outward of said shaft in a direction diametrically opposed to said permanent magnet means, said balancing portion disposed to lie on opposite sides of said damper means when said balance wheel assembly is in said neutral position.

13. In a clock movement, the combination comprising a balance wheel mounted on a balance staff for timed rotary oscillation, an escapement shaft parallel to said balance staff and including a radially extending escapement gear carried on said shaft having teeth around the outer periphery thereof, an escapement lever for converting oscillatory motion of said balance wheel into unidirectional rotation of said escapement wheel, and pivot means between said balance staff and said escapement wheel shaft for pivotally supporting said escapement lever intermediate its ends, said escapement lever being constructed of flat sheet material and including an arcuate sector adjacent one end spaced outwardly of an adjacent portion of the periphery of said escapement gears, and in coplanar relation therewith, and a pair of spaced apart, integrally formed, coplanar lugs projecting from said arcuate sector toward said escapement gear for alternate engagement with the teeth of said gear to advance the gear a selected degree of rotation in one direction on each angular oscillation of said one end of said lever, said lugs being spaced inwardly of the outer ends of said arcuate sector, said arcuate sector having a pair of edge portions outwardly of said respective lugs, each edge portion adapted to alternately engage the teeth of said escapement gear after full engagement of the adjacent lug therewith, thereby preventing further rotation of said gear until said adjacent lug begins to move out of engagement with said gear.

14. The clock movement of claim 13 wherein the outer ends of each lug is formed with a sloped cam surface adapted to contact teeth on said gear and thereby rotate the gear in one direction a selected degree upon movement of said lug into a gear engaging position.

15. The clock movement of claim 13 wherein the other end of said escapement lever is formed with a longitudinal slot extending inwardly toward said pivot means, said balance wheel including pin means eccentric of said balace staff engageable in said slot to drive said other end of said lever past dead center on each oscillation of said balance wheel in either direction.

16. The clock movement of claim 15 wherein said eccentric pin means is engaged within said slot for only a fraction of the time during an oscillation thereof in either direction.

References Cited

UNITED STATES PATENTS 3,446,007  5/1969  Cohen _____ 58—28

FOREIGN PATENTS 1,158,453  11/1963  Germany _____ 58—28

RICHARD B. WILKINSON, Primary Examiner

E. C. SIMMONS, Assistant Examiner

U.S. Cl. X.R.

58—107; 310—36